United States Patent [19]

Layton et al.

[11] Patent Number: 4,893,499

[45] Date of Patent: Jan. 16, 1990

[54] METHOD AND APPARATUS FOR DETECTING LEAKS IN IC PACKAGES BY SENSING PACKAGE DEFLECTIONS

[75] Inventors: Wilbur T. Layton, San Diego; Dale L. Robinson, Escondido; Jerry I. Tustaniwskyj, Mission Viejo, all of Calif.

[73] Assignee: Unisys Corporation, Blue Bell, Pa.

[21] Appl. No.: 280,089

[22] Filed: Dec. 5, 1988

[51] Int. Cl.$^4$ ............................................. G01M 3/36
[52] U.S. Cl. .................................................... 73/49.3
[58] Field of Search ......................... 73/49.2, 49.3, 52

[56] References Cited

U.S. PATENT DOCUMENTS

| | | | |
|---|---|---|---|
| 3,559,460 | 2/1971 | Orner | 73/49.3 |
| 4,663,964 | 5/1985 | Croce | 73/49.3 |
| 4,715,215 | 12/1987 | Perhach et al. | 73/49.3 |
| 4,771,630 | 9/1988 | Croce et al. | 73/49.3 |

*Primary Examiner*—Hezron E. Williams
*Attorney, Agent, or Firm*—Charles J. Fassbender; Robert S. Bramson

[57] ABSTRACT

A leak in an enclosure of an integrated circuit package is detected by the steps of: filling the enclosure with a first gas at the time the enclosure is sealed; subsequently enveloping the integrated circuit package with a second gas that is different than the first gas; holding the second gas at a constant pressure over a certain time period; and sensing a surface of the enclosure, during the above steps, for the presence of microscopic deflections. If the enclosure has a gross leak, no deflection will occur when the package is initially enveloped with the second gas. If the package has a minor leak, a deflection will occur when the package is initially enveloped with the second gas, and the amount of the deflection will decrease during the holding time period. Preferably, the second gas is lighter than the first gas so that it diffuses into the cavity faster than the first gas diffuses out of the cavity; and preferably the microscopic deflections of the enclosure are sensed with a mechanical probe in increments of 0.0001 inches.

7 Claims, 4 Drawing Sheets

Fig. 3 eq.1 ~ $P = P_a + (P_o - P_a)e^{-ct}$ eq.2 ~ $C = \dfrac{(L')\left(\dfrac{MW_A}{MW_G}\right)^{\frac{1}{2}}}{(V)}$ eq.3 ~ initial conditions = 1 atm air in cavity
                         1.068 atm He outside cavity
                         $V = 2.8\,cc$
                         $L' = 10^{-6}\,atm\text{-}cc/sec$ eq.4 ~ for air leaking out, $P_o = 1$
                         $P_a = 0$ $\therefore P_{AIR} = 0 + (1-0)e^{-c_A t} = e^{-c_A t}$ eq.5 ~ $c_A = \dfrac{(10^{-6})(1)}{2.8} = 3.57(10^{-7})$ eq.6 ~ for He leaking in, $P_o = 0$
                      $P_a = 1.068$ $\therefore P_{He} = 1.068 + (0 - 1.068)e^{-c_{He} t}$ eq.7 ~ $c_{He} = \dfrac{(10^{-6})\left(\dfrac{28.7}{4}\right)^{\frac{1}{2}}}{2.8} = 9.56(10^{-7})$ eq.8 ~ $P_T = P_{He} + P_{AIR}$ eq.9 ~ $1.034 = 1.068 - 1.068 e^{-9.56(10^{-7})t} + e^{-3.57(10^{-7})t}$ eq.10 ~ $t \approx 15\,HRS$

Fig. 4 eq. 21 ~ initial conditions = 1 atm air in cavity 1.068 air outside cavity

V = 2.8 cc eq. 22 ~ $p = 1.068 + (1 - 1.068)e^{-3.57(10^{-7})t}$ eq. 23 ~ $1.034 = p = 1.068 - 0.068 e^{-3.57(10^{-7})t}$ eq. 24 ~ t = 540 HRS

Fig. 5 eq. 31 ~ $y_{MAX} \approx \dfrac{\alpha q b^4}{E t^3}$ eq. 32 ~ a = 1.90"
b = 1.65"
$\alpha$ = 0.0175
E = 20 × 10$^6$ psi (Kovar)
q = 1 psi
t = 0.015"

eq. 33 ~ $y_{MAX}$ = 0.003"

METHOD AND APPARATUS FOR DETECTING LEAKS IN IC PACKAGES BY SENSING PACKAGE DEFLECTIONS

BACKGROUND OF THE INVENTION

This invention relates to methods and apparatus for testing integrated circuit packages (IC packages) for leaks.

One type of integrated circuit package which the present invention tests is comprised of a ceramic body and a lid that is sealed to the body to thereby form an enclosed cavity. Lying within this cavity are semiconductor chips, and they are electrically interconnected via conductors which run through and extend from the body. Ideally, the cavity in which the chips lie is airtight, and thus the chips are protected from external contaminants. However, in any large volume manufacturing environment, a certain percentage of the cavities will have a leaky lid seal. Consequently, all of the packages must be tested for leaks.

Conventionally, the packages are tested for leaks as follows. To begin, the package is submerged in a first liquid which has a relatively low boiling temperature. This step is performed to force some of the liquid into the cavity if the lid seal has a gross leak. Thereafter, the package is submerged in a second liquid which is hotter than the boiling temperature of the first liquid. This step is performed in order to vaporize any of the first liquid which may have leaked into the package cavity. Such a vapor will then leak back out of the cavity and produce bubbles in the second liquid, which indicates the package has a gross leak.

If the package produces no bubbles in the second liquid, then it undergoes another test which detects minor leaks. Initially, in this test, the package is placed in a container which is filled with a certain gas. This step is performed in order to let some of the gas seep into the cavity through any minor leak in the lid seal. Thereafter, all of the gas is removed from the container so that the package is then surrounded by a vacuum; and a sensor in the container monitors the vacuum for any trace of the gas leaking from the cavity back into the container.

While the above described testing process does work, it also has some major drawbacks. For example, if the lid has a gross leak, then the first liquid which seeps into the cavity during the test procedure can contaminate the chips. Thus, the package cannot be salvaged after a leak is detected.

Another problem with the above testing process is that separate tests and separate test stations are required to detect gross and minor leaks. Liquids are required in the gross leak test while gas is required in the fine leak test.

Another problem with the above testing process is that it takes a long time to complete. For example, one common practice in the gross leak test is to submerge the package in a liquid at 15 psi for 13 hours. That time can be shortened by increasing the pressure of the liquid; but increasing the pressure raises the risk of overstressing the package and actually causing leaks in the lid seal and/or damaging the conductors in the package that connect to the chip. Similar stresses are induced in the package in the minor leak test when the package is subjected to a vacuum.

Accordingly, a primary object of the invention is to provide an improved method and apparatus for detecting leaks in integrated circuit packages in which all of the above problems are avoided.

BRIEF SUMMARY OF THE INVENTION

In accordance with the invention, a leak in an enclosure of an integrated circuit package is detected by the steps of: filling the enclosure with a first gas at the time the enclosure is sealed; subsequently enveloping the integrated circuit package with a second gas that is different than the first gas; holding the second gas at a constant pressure over a certain time period; and sensing a surface of the enclosure, during the above steps, for the presence of microscopic deflections. If the enclosure has a gross leak, no deflection will occur when the package is initially enveloped with the second gas. If the package has a minor leak, a deflection will occur when the package is initially enveloped with the second gas, but the amount of the deflection will decrease while the pressure of the second gas is held constant.

Preferably, the second gas is lighter than the first gas so that it diffuses into the cavity faster than the first gas diffuses out of the cavity. As one specific example, the first gas can be air; the second gas can be helium; the constant holding pressure of the second gas can be within 5 psi of atmospheric; the time period over which the second gas is held at the constant pressure is six hours; and the microscopic deflections of the enclosure are sensed with a mechanical probe in increments of 0.0001 inches.

BRIEF DESCRIPTION OF THE DRAWINGS

Various features and advantages of the invention are described herein in conjunction with the accompanying drawings wherein:

FIG. 3 is a set of equations which explain how the FIG. 1 tester is able to detect slow leaks quickly;

FIG. 4 is a set of equations which compare the quick test of FIG. 3 to a much slower test; and FIG. 5 is a set of equations which explain why the FIG. 1 tester will not damage an integrated circuit package that it is testing.

DETAILED DESCRIPTION OF THE INVENTION

Figure 1:
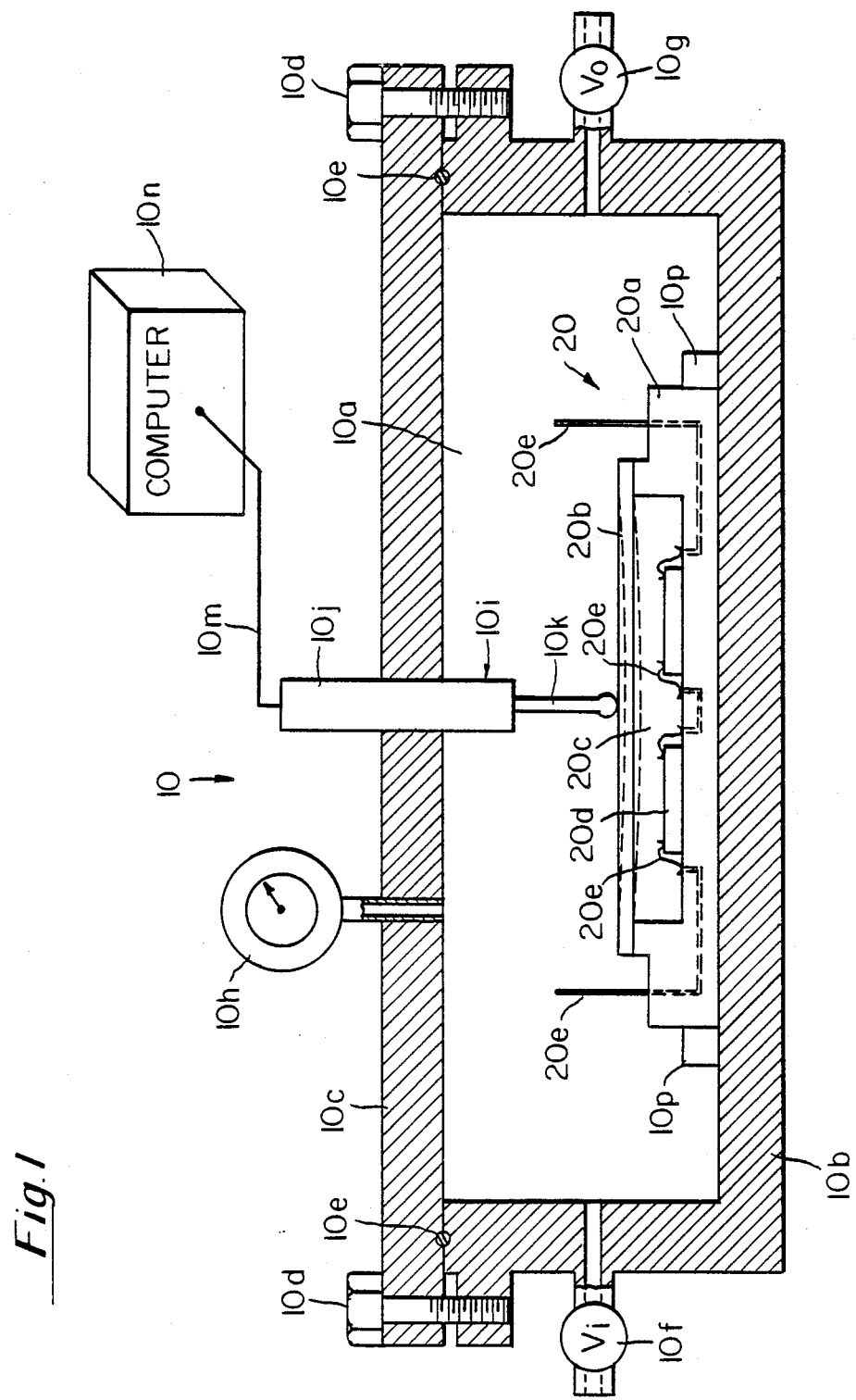
FIG. 1 is a sectional view of a tester, for detecting leaks in integrated circuit packages, which is constructed in accordance with the invention.

Referring now to FIG. 1, it shows a tester 10 by which an integrated circuit package 20 is checked for leaks in accordance with the present invention. This integrated circuit package 20 includes a ceramic body 20a and a lid 20b which together form an enclosure for a cavity 20c. Lying in cavity 20c are semiconductor chips 20d, and they are electrically interconnected via conductors 20e. Ideally, cavity 20c has no leaks, and it is filled with air at atmospheric pressure.

Package 20 is positioned inside of a chamber 10a of the tester 10. This tester 10 has a bottom section 10b and a top section 10c, and they are held together by A seal ring 10e between the top and bottom fasteners 10d. A seal ring 10e between the top and bottom sections of the tester 10 keeps the chamber 10a airtight.

Also included in the tester 10 is an input valve 10f, an output valve 10g, a pressure gauge 10h, and a distance-measuring probe 10i. Input valve 10f provides a means for enveloping the integrated circuit package 20 in a certain gas in chamber 10a; gauge 10h provides a means for measuring the pressure of that gas; and output valve 10g provides a means for purging the gas from chamber 10a.

Probe 10i includes a member 10j which is rigidly held in place by the tester section 10c, and it further includes another member 10k which is moveable. Specifically, member 10k slides out of the fixed member 10j until it contacts the lid 20b of the integrated circuit package. That distance d by which member 10k travels until it contacts lid 20b is sensed within member 10j, which also generates electrical signals representing the distance d and sends them on a conductor 10m to a computer 10n.

Figure 2:
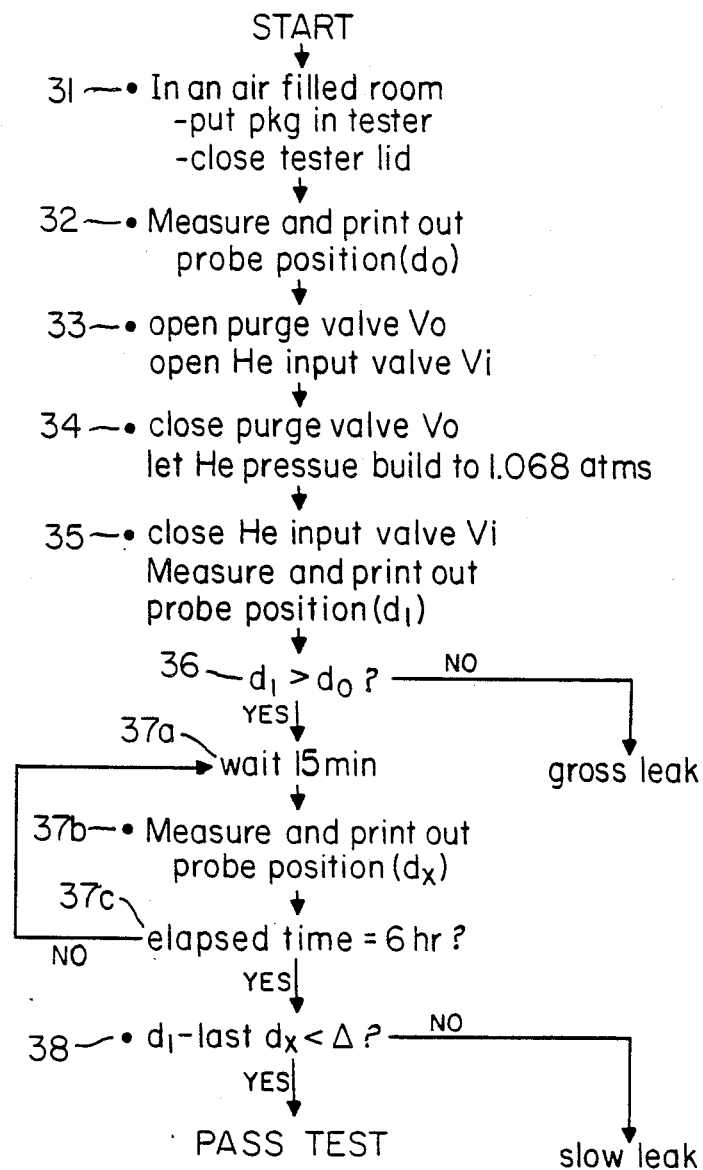
FIG. 2 illustrates the steps of a process by which the FIG. 1 tester operates.

Considering now FIG. 2, it shows a sequence of steps by which the tester 10 operates in order to detect a leak in cavity 20c of the integrated circuit package. To begin, as is indicated by step 31, the tester 10 is opened by an operator in a room that is filled with air at atmospheric pressure; then the integrated circuit package 20 is placed in the bottom section 10b of the tester; and then the tester is closed. A fixture 10p is provided in the tester which aligns the center of the integrated circuit package lid 20b with the moveable probe member 10k.

During the above step 31, the input valve 10f is closed. Thus, when step 31 is complete, chamber 10a is filled with air at atmospheric pressure. Under those conditions, as is indicated by step 32, the computer 10n reads and prints out the distance $d_o$ by which the moveable probe member 10k is extended.

Thereafter, the input valve 10f, is opened, and the output valve 10g is also open. That enables another gas to pass into the chamber 10a and purge all of the air from it. This step is indicated by reference numeral 33. Preferably, the new gas which is introduced into chamber 10a is one which is lighter than air, such as helium.

Next, as is indicated by step 34, the output valve 10g is closed; and the gas which is passing through the input valve 10f is allowed to build up to a certain pressure in chamber 10a. Preferably, that pressure is greater than atmospheric pressure but within ten psi of it. Step 34, as an example, shows helium gas entering chamber 10a until it reaches a pressure of 1.068 atmospheres, which is one psi above atmospheric.

When the preferred gas pressure in chamber 10a is reached, the input valve 10f is closed. Then, computer 10m reads and prints out the new distance $d_1$ by which the probe member 10k s extended. This step is indicated by reference numeral 35.

If the integrated circuit package 20 has a large leak between the lid 20b and the body portion 20a, then the lid 20b will not deflect during the above step 34. Instead, the gas that is introduced into chamber 10a will quickly seep into the cavity 20c and thereby equalize the pressure on both sides of the lid. This is indicated by the "NO" path in step 36.

Conversely, if cavity 20c of the integrated circuit package has just a very small leak, or if cavity 20c is airtight, the effect of step 34 will be to deflect the lid 20b slightly inward towards the cavity 20c. Thus, the distance $d_1$ will be slightly larger than the distance $d_o$. This is indicated in FIG. 2 by the "YES" path of step 36, and it is also indicated by the dashed lines by lid 20b in FIG. 1 which show the lid's deflected position. Thereafter, the computer 20m periodically senses and prints out the distance by which the moveable probe member 10k is extended. This is indicated in FIG. 2 by steps 37a, 37b, and 37c. There, the distance samples are taken by the computer and printed out once every 15 minutes over a total elapsed time period of six hours.

If cavity 20c of the integrated circuit package 20 has a slow leak, then the helium from chamber 10a will diffuse into the cavity 20c. At the same time, air will diffuse from the cavity 20c into chamber 10a. However, helium diffuses faster than air. Consequently, if cavity 20c has a slow leak, the total pressure in cavity 20c will rise.

A rise in pressure in cavity 20c will cause the magnitude of the periodic distance samples of steps 37a, 37b, 37c to decrease. And such a decrease, as is shown by the "NO" path of step 38, indicates cavity 20c is not hermetic. Conversely, if cavity 20c is hermetic, the periodic distance samples will stay the same, or at least they will not decrease by more than a certain acceptable limit. This is indicated by the "YES" path of step 38.

One major feature of the above-described FIG. 2 process is that very small leaks in cavity 20c can be detected quickly. This feature, as is explained below in conjunction with FIG. 3, results from the helium in chamber 10a diffusing into cavity 20c faster than the air diffuses out of the cavity.

Consider now equation 1 in FIG. 3. In that equation, P is the partial pressure of any particular gas in a container which has a small leak; $P_a$ is the partial pressure of the same gas outside of the container; $P_o$ is the initial pressure of the same gas within the container; t is time; and C is a constant which is given by equation 2. In equation 2, $MW_a$ is the molecular weight of air; $MW_g$ is the molecular weight of the gas to which equation 1 is being applied; V is the volume of the container which has the small leak; and L, is a National Bureau of Standards leak rate that is defined as the rate at which air at one atmosphere of pressure (absolute) on one side of the leak would escape into a vacuum on the other side of the leak.

Equations 1 and 2 can be applied to cavity 20c of the integrated circuit package 20 for any gas and any set of initial conditions; and one representative set of initial conditions is given in equation 3 as an example. There, at time t=0, cavity 20c is filled with air at a pressure of one atmosphere; and the tester enclosure 10a is filled with helium at a pressure of 1.068 atmospheres. No air is in the tester enclosure 10a; and no helium cavity 20c of the integrated circuit package. Other initial conditions are that the volume of cavity 20c is assumed to be 2.8 cubic centimeters; and the maximum acceptable leak rate through the package is given at $1 \times 10^{-6}$ ATM-cc per second.

Applying the initial conditions of equation 3 to equation 1, for the case of air leaking out of cavity 20c, yields equation 4. And, applying the conditions of equation 3 to equation 2 for the same case (i.e., air leaking out of cavity 20c) yields equation 5.

Similarly, applying the initial conditions of equation 3 to equation 1, for the case of helium leaking into cavity 20c, yields equation 6. And, applying the conditions of equation 3 to equation 2 for the same case (i.e., helium leaking into cavity 20c) yields equation 7.

Next, to get a mathematical expression for the total pressure in cavity 20c, the partial pressure of air in that cavity (as given by equation 4) is merely added to the partial pressure of helium in the cavity (as given by equation 6). This is stated by equation 8.

In equation 8, he only variables are the total pressure in cavity 20c and time. Thus, by setting the total pressure equal to a certain value, the variable time can be determined. For example, in equation 9, the total pressure is set equal to the initial cavity pressure plus 50% of the difference between the final and the initial cavity pressures, or 1.034 atmospheres. Then, solving equation 9 for the variable t yields equation 10, which states that t is equal to about 15 hours.

For comparison purposes, suppose that the tester chamber 10a is filled with air rather than helium. In that case, the initial conditions for equations 1 and 2 would be as given by equation 21 of FIG. 4. Equation 21 states that when $t=0$, there is 1.0 atmospheres of air in cavity 20c; and there is 1.068 atmospheres of air in the enclosure 10a. All of the other initial conditions (i.e., the volume V of the cavity 20c and the leak rate L of the cavity) remain the same.

Applying the initial conditions of equation 21 to equations 1 and 2 yields equation 22. Then, setting the pressure of equation 22 equal to 50% of its final value or 1.034 atmospheres yields equation 23. Solving equation 23 for the variable time yields equation 24 —which states that to reach the 50% pressure point will take about 540 hours.

Turning now to FIG. 5, the degree to which the lid 20b of the integrated circuit package 20 is deflected by the above described pressure variations in the tester 10 will be analyzed. In FIG. 5, the lid deflection is given by equation 21. There, q is the total pressure difference that is applied across the lid; E is the modulus of elasticity of the material of which the lid is made; t is the thickness of the lid; b is the shorter dimension of the lid; and alpha is a constant for a given length/width ratio.

As an example, consider the parameters of equation 32. There, the pressure difference q across the lid is 1 psi; the modulus of elasticity is for a commonly used IC packaging material called Kovar; the thickness of the lid is 15 mils; and the length and width of the lid respectively are 1.90 inches and 1.65 inches. Yields equation 33, which states that the maximum distance by which the lid 20b deflects is 3 mils. That distance is more than large enough to be detected by the length-measuring probe 10i, since such probes measure distance in increments of less than 0.0001 inches. At the same time, 3 mils is small enough to prevent the lid from hitting and damaging the conductors 20e which extend from the chips 20d.

Referring next to Table I, it shows the results of an actual leak test that was performed on several integrated circuit packages with the FIG. 1 tester. In this particular tester, the enclosure 10a was large enough to hold several integrated circuit packages; and nine of the packages are identified by the numbers 1 thru 9 in the top row of Table I. Also in Table I, the leftmost column gives the elapsed time at which the computer 10n and printed out the distance by which the moveable probe member 10k was extended; and the columns underneath each of the device numbers give the distances (in mils) by L which probe member 10k extended beyond its initial position $d_0$ for the corresponding device.

Inspection of the first row of Table I shows that none of the nine packages had a gross leak in their cavity 20c. This is evidenced by the fact that the lid 20b for each of the packages deflected inward in response helium being introduced into chamber 10a to a pressure of 1.068 atmospheres.

However, inspection of the last row of Table I shows that two of the nine packages (namely packages 2 and 4) had fine leaks in their cavity 20c. Package 2 has the larger leak as is indicated by a delta of $d_1$ minus the last $d_x$ equaling 1.71 mils. In the remaining packages 1, 3, 5, 6, 7, 8 and 9, the delta of $d_1$ minus the last $d_x$ is within an allowable tolerance of 0.25 mils; and thus those packages pass the leak test.

A preferred embodiment of the invention has now been described in detail. In addition, however, many changes and modifications can be made to these details without departing from the nature and spirit of the invention.

TABLE I

| Pkgs | 1 | 2 | 3 | 4 | 5 | 6 | 7 | 8 | 9 |
|---|---|---|---|---|---|---|---|---|---|
| Probe Distance $d_1$–$d_0$ with He in Chamber 10a at 1.068 ATM ||||||||||
| | 1.79 | 1.41 | 1.54 | 1.57 | 1.40 | 1.82 | 1.92 | 1.94 | 1.53 |
| Hrs: Min | Probe Distance $d_x$–$d_0$ at 15 Minute Time Intervals |||||||||
| 0:00 | 1.79 | 1.42 | 1.54 | 1.57 | 1.40 | 1.82 | 1.92 | 1.94 | 1.53 |
| 0:15 | 1.79 | 1.13 | 1.53 | 1.53 | 1.38 | 1.81 | 1.91 | 1.93 | 1.51 |
| 0:30 | 1.79 | 0.87 | 1.52 | 1.51 | 1.37 | 1.81 | 1.91 | 1.93 | 1.50 |
| 0:45 | 1.77 | 0.64 | 1.50 | 1.48 | 1.35 | 1.78 | 1.88 | 1.91 | 1.49 |
| 1:00 | 1.77 | 0.47 | 1.49 | 1.46 | 1.35 | 1.78 | 1.88 | 1.90 | 1.48 |
| 1:15 | 1.76 | 0.33 | 1.48 | 1.43 | 1.34 | 1.78 | 1.87 | 1.90 | 1.47 |
| 1:30 | 1.75 | 0.21 | 1.47 | 1.41 | 1.33 | 1.77 | 1.86 | 1.89 | 1.47 |
| 1:45 | 1.75 | 0.11 | 1.46 | 1.39 | 1.32 | 1.77 | 1.85 | 1.87 | 1.46 |
| 2:00 | 1.74 | 0.03 | 1.44 | 1.36 | 1.32 | 1.76 | 1.84 | 1.86 | 1.45 |
| 2:15 | 1.73 | −0.04 | 1.43 | 1.34 | 1.31 | 1.75 | 1.83 | 1.85 | 1.44 |
| 2:30 | 1.72 | −0.09 | 1.42 | 1.32 | 1.30 | 1.74 | 1.82 | 1.84 | 1.44 |
| 2:45 | 1.71 | −0.14 | 1.41 | 1.30 | 1.29 | 1.73 | 1.81 | 1.84 | 1.43 |
| 3:00 | 1.71 | −0.16 | 1.41 | 1.28 | 1.29 | 1.73 | 1.81 | 1.84 | 1.43 |
| 3:15 | 1.71 | −0.19 | 1.40 | 1.27 | 1.28 | 1.72 | 1.80 | 1.83 | 1.43 |
| 3:30 | 1.71 | −0.21 | 1.39 | 1.25 | 1.29 | 1.72 | 1.80 | 1.83 | 1.43 |
| 3:45 | 1.71 | −0.22 | 1.39 | 1.24 | 1.28 | 1.72 | 1.81 | 1.83 | 1.42 |
| 4:00 | 1.71 | −0.24 | 1.38 | 1.22 | 1.27 | 1.72 | 1.80 | 1.83 | 1.42 |
| 4:15 | 1.70 | −0.26 | 1.37 | 1.20 | 1.27 | 1.70 | 1.78 | 1.81 | 1.41 |
| 4:30 | 1.68 | −0.29 | 1.37 | 1.18 | 1.26 | 1.70 | 1.78 | 1.81 | 1.41 |
| 4:45 | 1.69 | −0.29 | 1.36 | 1.17 | 1.26 | 1.69 | 1.78 | 1.81 | 1.41 |
| 5:00 | 1.69 | −0.29 | 1.36 | 1.15 | 1.26 | 1.69 | 1.78 | 1.81 | 1.41 |
| 5:15 | 1.69 | −0.29 | 1.35 | 1.14 | 1.25 | 1.69 | 1.78 | 1.81 | 1.41 |
| 5:30 | 1.69 | −0.29 | 1.35 | 1.13 | 1.25 | 1.70 | 1.78 | 1.81 | 1.41 |
| 5:45 | 1.69 | −0.29 | 1.35 | 1.11 | 1.26 | 1.70 | 1.78 | 1.80 | 1.41 |
| 6:00 | 1.69 | −0.29 | 1.35 | 1.10 | 1.25 | 1.70 | 1.78 | 1.81 | 1.41 |
| Distance $d_1$–last $d_x$ |||||||||||
| | 0.10 | 1.71 | 0.19 | 0.47 | 0.15 | 0.12 | 0.14 | 0.13 | 0.12 | for example, various means can be used to sense the deflections of the integrated circuit package 20 that is being tested. One suitable probe 10i is the P10 by SYLVAC Corp. at Rue du Jura 2, 1023 Crissier, Switzerland. Laser distance sensors can also be used.

As another alternative, various gases other than air and He can be used to respectively fill the IC package cavity 20c and the tester enclosure 10a. For example, cavity 20c could be filled with nitrogen or argon, and the tester enclosure could be filled with any lighter gas. Conversely, the cavity 20c could be filled with the lighter gas while the tester is filled with nitrogen or argon.

As still another alternative, the pressure at which the gas in the tester enclosure 10a is held constant can be the same or below the pressure of the gas in the chip cavity 20c. However, the pressure difference across the package lid preferably is always kept within 10 psi to avoid overstressing the lid seal.

Further, the total time interval during which deflections are periodically measured can be decreased from six hours. For example, inspection of Table I shows that undesired deflection changes are detectable in package number 2 within the very first hour.

Accordingly, it is to be understood that the invention is not limited to the above described details but is defined by the appended claims.

What is claimed is:

1. A method of detecting whether or not an enclosure of a package leaks above a certain minimum rate; said enclosure being filled with a first gas at a first pressure; and, said method including the steps of:

- enveloping said package in a second gas at a second pressure;
- measuring respective deflections, by a surface of said enclosure, at the start and end of a time interval during said enveloping step; and,
- rejecting said package for having a leak if the difference between said respective deflections exceeds a certain limit; wherein,
- said second gas is of a type which leaks into said enclosure faster than said first gas leaks out, said second pressure is larger than said first pressure, and said time interval is substantially shorter than one during which respective deflections occur that differ by said limit under the conditions where said package has said minimum leak rate and is enveloped by said first gas at said second pressure.

2. A method according to claim 1 wherein said first gas is at least as heavy as air, said second gas is at least as light as helium, and said time interval is no longer than forty hours.

3. A method according to claim 2 wherein said time interval is no longer than six hours.

4. A method according to claim 3 wherein said time interval is no longer than one hour.

5. A method according to claim 1 wherein said second pressure exceeds said first pressure by no more than ten psi.

6. A method according to claim 5 wherein said package includes a broad thin lid, and said lid is sensed for deflections.

7. A method according to claim 6 wherein said first gas is at least as heavy as air, said second gas is at least as light as helium, and said time interval is no longer than forty hours.

* * * * *